United States Patent Office 3,318,955 Patented May 9, 1967

3,318,955

PRODUCTION OF FORMALDEHYDE

Ulrich Gerloff and Juergen Jahn, Ludwigshafen (Rhine), and Otto Goehre, Heidelberg, Germany, assignors to Badische Aniline- & Soda-Fabrik Aktiengesellschaft, Ludwigshafen (Rhine), Germany No Drawing. Filed Feb. 24, 1965, Ser. No. 435,088
1 Claim. (Cl. 260—603)

This application is a continuation-in-part of our application Ser. No. 171,358, filed Feb. 6, 1962. It relates to the removal of volatile iron carbonyl compounds from crude methanol and to the production of formaldehyde using crude methanol freed from volatile iron pentacarbonyl.

Crude methanol, which is prepared technically from carbon monoxide and hydrogen, contains small amounts of iron carbonyl compounds, especially volatile iron pentacarbonyl, and is therefore not immediately suitable for many purposes. For example it cannot be dehydrogenated direct to formaldehyde by the use of silver metal catalysts because these catalysts are rapidly poisoned by volatile iron carbonyl compounds. Although a number of processes is known by which the deleterious iron pentacarbonyl may be removed from crude methanol, these processes are troublesome and require either chemical reagents, such as potassium permanganate or hydrogen peroxide, or complicated apparatus, such as an ozone producer or an ultraviolet radiation apparatus.

It is an object of the present invention to provide a process for the manufacture of methanol which is free from volatile iron pentacarbonyl and which can thus be dehydrogenated to formaldehyde over silver metal catalysts, the catalyst having a long life. Another object of this invention is to provide a process for purifying crude methanol for the said purpose without the use of expensive chemical reagents or complicated apparatus. A further object of the present invention is to provide a process for the manufacture of formaldehyde in which the said crude methanol freed from volatile iron pentacarbonyl is used as the feed material. Other objects and advantages of the invention will be apparent from the following description.

In accordance with this invention the said objects and advantages are achieved by removing from crude methanol a fraction having a lower boiling point than methanol, vaporizing the residual crude methanol thus freed from volatile iron pentacarbonyl and reacting the methanol vapor to formaldehyde by contacting it with silver metal at elevated temperature.

The boiling point of iron pentacarbonyl is 105° C. at atmospheric pressure. Iron pentacarbonyl would therefore have been expected in the distillation residue. Surprisingly, however, it passes over the top with the low boiling fraction of the crude methanol. The residual crude methanol boils within a range of more than 30° C., namely between approximately 64.5° and approximately 98.5° C. In general, it has permanganate numbers of 2 to 3, at any rate below 10. On mixing with concentrated sulfuric acid it assumes a dark brown color. It is surprising that it should be possible to react the crude methanol to formaldehyde with good yields and long periods of operation without changing the catalyst. For it is known from Ullmann, "Encyklopädie der technischen Chemie," 3rd ed., vol. VII (1956), p. 660, that methanol to be used in the manufacture of formaldehyde over silver catalysts should boil within 0.2° C., not decolorize permanganate solution in 20 minutes and not become discolored on mixing with concentrated sulfuric acid. Moreover, it is known from German Patent 1,064,936, lines 20 and 21, that methanol for use in the manufacture of formaldehyde over silver catalysts should have a permanganate number of at least 30.

By "crude methanol" we understand a product obtained by the conventional reaction of carbon monoxide and hydrogen over zinc oxide/chromium oxide at temperatures between 330° and 400° C. and at pressures between 150 and 400 atmospheres. It usually comprises 91 to 93 wt. percent of methanol, 3 to 4 wt. percent of dimethyl ether, 3 to 4 wt. percent of water, 0.1 to 0.3 wt. percent of methyl formate and 0.4 to 0.8 mg. Fe/kg. in the form of volatile iron pentacarbonyl in addition to other, partly unidentified, impurities such as higher alcohols.

The volatile iron pentacarbonyl may be removed batchwise, for example by heating crude methanol in a still and distilling off a forerun through a column. It is however preferable to carry out the process continuously by introducing crude methanol continuously into a column, drawing off the volatile iron pentacarbonyl together with low boiling constituents of the crude methanol and a small amount of methanol at the top and recovering from the bottoms a methanol which no longer contains any volatile iron pentacarbonyl and which is therefore suitable for catalytic dehydrogenation to formaldehyde over silver metal catalysts.

Removal of the volatile iron pentacarbonyl is carried out in columns widely used in the art, i.e., packed columns, bubble-tray columns or sieve-plate columns. The number of theoretical trays required depends above all on the reflux ratio and the iron pentacarbonyl content of the crude methanol. In general, columns having 10 to 50, preferably 12 to 35, theoretical trays are used.

The crude methanol may be introduced into the middle or lower part of the column. Surprisingly, however, the best results are obtained when the crude methanol is introduced into the upper third of the column, advantageously immediately beneath the dephlegmator.

The temperature in the bottom of the column is kept at about 65° C. by heating. The top temperature depends on the degree of contamination of the crude methanol and is below 64.5° C., especially between 55° and 62° C. It is advantageous to use a reflux ratio between 5:1 and 50:1, especially between 10:1 and 20:1.

The amount of distillate which must be distilled off depends on the one hand on the efficiency of the column and on the other hand on the content of iron pentacarbonyl in the crude methanol. All the dimethyl ether and methyl formate is distilled off, together with 0.2 to 1.5 wt., percent preferably about 1 wt. percent methanol, with reference to the crude methanol.

Working under atmospheric pressure or slightly decreased pressure (i.e., between atmospheric pressure and 400 mm. Hg) is preferred because it is the most simple method technically. Obviously, it is also possible to carry out the process at increased or decreased pressure, for example in the range between 200 mm. Hg and 1.5 atm. abs.

The residue crude methanol which has been freed from volatile iron pentacarbonyl (i.e., which contains less than $10^{-4}$ mg. Fe/kg. in the form of iron pentacarbonyl) may then be reacted to formadehyde in conventional manner, no claim being made herein to the method used. The residual crude methanol is vaporized, preferably together with such an amount of water that the methanol/water vapor mixture contains from 0.2 to 1.8 moles of water for each mole of methanol. The vaporous mixture is passed over silver netting or silver crystals together with 0.4 to 0.5 mole, based on methanol, of oxygen, preferably as air. Obviously, the crude methanol free from iron pentacarbonyl may be vaporized separately and only then mixed with water vapor. The temperature at the catalyst is 450° to 720° C., while the residence time is 0.005 to 0.002 second. By cooling the vaporous mixture, a 30 to 40% aqueous solution of formaldehyde is obtained which usually contains 0.9 to 2.0 wt. percent of methanol. It is also possible to use conditions under which more of the methanol, for example 10 to 25%, remains unreacted. Higher yields may thus be achieved, but the unreacted methanol must then be separated from the formaldehyde solution by distillation.

The invention is illustrated by, but not limited to, the following example.

*Example*

For the manufacture of formaldehyde a crude methanol is used which has been obtained by reacting carbon monoxide and hydrogen at the molar ratio of 1 to 5 at a pressure of 300 atmospheres and a temperature of 370° C. over a zinc oxide/chromium oxide catalyst (56 wt. percent Zn and 16 wt. percent Cr). The crude methanol contains 3.6 wt. percent of water, 3.2 wt. percent of dimethyl ether, 0.18 wt. percent of methyl formate and 0.5 mg. Fe/kg. in the form of volatile iron pentacarbonyl.

5 metric tons per hour of this crude methanol is fed to the upper third of a column 17 m. in height and having a diameter of 70 cm. The column has a separating efficiency of 20 theoretical trays and is operated at a reflux ratio of 17:1. All dimethyl ether and all methyl formate together with 1 wt. percent of methanol is taken overhead.

Crude methanol thus freed from volatile iron pentacarbonyl is vaporized at the rate of 2,070 kg. per hour (i.e., 1,925 kg. methanol 100%) and the vapor passed together with 1,283 kg. of water vapor and 2.760 $m^3$ (at 50° C.) of air over 70 kg. of silver crystals arranged in a layer approximately 1 cm. thick. The temperature at the catalyst is 650° C. The vaporous mixture is cooled, first to 150° C. and then to 60° C. in a tubular condenser. A 35 wt. percent aqueous formaldehyde solution is obtained which contains 1.3 wt. percent of methanol. The yield of formaldehyde, based on 100% methanol, is 85.9% of the theory.

What we claim is:

In a process for producing formaldehyde by reacting methanol to formaldehyde in the vapor phase at an elevated temperature over silver metal catalyst, the improvement which comprises: using as the methanol reactant crude methanol from which a fraction boiling below 64.5° C. has been distilled off, said crude methanol having been obtained by reacting carbon monoxide and hydrogen in the presence of a zinc oxide-chromium oxide catalyst.

References Cited by the Examiner

UNITED STATES PATENTS

| | | | |
|---|---|---|---|
| 1,558,559 | 10/1925 | Mittasch et al. | 260—449.5 |
| 1,833,331 | 12/1931 | Park | 202—57 |
| 2,465,498 | 4/1949 | Uhl et al. | 260—603 |
| 2,821,503 | 1/1958 | Willke et al. | 202—57 |

LEON ZITVER, *Primary Examiner.*

DANIEL D. HORWITZ, *Examiner.*

R. H. LILES, *Assistant Examiner.*